US011833678B2

(12) United States Patent
Lee

(10) Patent No.: US 11,833,678 B2
(45) Date of Patent: Dec. 5, 2023

(54) LINEAR ROBOT AND METHOD OF MANUFACTURING THE SAME

(71) Applicant: GnB, Suwon-si (KR)

(72) Inventor: Won Hyung Lee, Anyang-si (KR)

(73) Assignee: GnB, Suwon-si (KR)

( * ) Notice: Subject to any disclaimer, the term of this patent is extended or adjusted under 35 U.S.C. 154(b) by 0 days.

(21) Appl. No.: 17/699,120

(22) Filed: Mar. 20, 2022

(65) Prior Publication Data
US 2023/0112266 A1 Apr. 13, 2023

(30) Foreign Application Priority Data

Oct. 7, 2021 (KR) .......................... 10-2021-0133188

(51) Int. Cl.
*B25J 9/00* (2006.01)
*B25J 19/00* (2006.01)
(Continued)

(52) U.S. Cl.
CPC .............. *B25J 9/0009* (2013.01); *B25J 9/123* (2013.01); *B25J 13/088* (2013.01); *B25J 19/0062* (2013.01); *B25J 19/0075* (2013.01)

(58) Field of Classification Search
CPC ................ B25J 9/123; F16H 2025/204; F16H 2025/2034; F16H 25/2015; F16H 2025/2031; F16H 2025/2037
See application file for complete search history.

(56) References Cited

U.S. PATENT DOCUMENTS 6,293,183 B1 * 9/2001 Noda .................... F15B 15/082
92/88
6,619,846 B1 * 9/2003 Nagai ................... F16C 29/005
384/43

(Continued)

FOREIGN PATENT DOCUMENTS

JP     59227351 A   * 12/1984   ......... B23Q 11/0875
JP     2822449 B       11/1998
(Continued)

OTHER PUBLICATIONS

Wear Resistant Coatings for Aluminum, Jul. 1, 2021, https://www.clintonaluminum.com/wear-resistant-coatings-for-aluminum/ (Year: 2021).*

(Continued)

*Primary Examiner* — Bobby Rushing, Jr.
(74) *Attorney, Agent, or Firm* — INSIGHT LAW GROUP, PLLC; Seung Lee

(57) ABSTRACT

A linear robot according to the present disclosure includes a main body unit including a main body base part seated on a ground surface, and main body sidewall parts protruding in an upward direction by a predetermined thickness from two opposite sides of the main body base part, the main body unit having an internal space defined by the main body base part and the main body sidewall parts; a transfer block unit partially accommodated in the internal space of the main body unit, configured to linearly move in one direction, and having an upper portion on which a transfer target object is seated, the transfer block unit being configured to transfer the transfer target object from a first position to a second position; and a pair of guide rail units disposed between the main body unit and the transfer block unit, coupled to the main body unit, and configured to guide the transfer block unit, in which the main body sidewall parts each have a guide rail unit accommodation groove recessed by a prede- (Continued)

termined length in a direction perpendicular to the upward direction, and at least a part of a surface of the guide rail unit accommodation groove has an uneven machined surface.

13 Claims, 9 Drawing Sheets

(51) Int. Cl.
*B25J 13/08* (2006.01)
*B25J 9/12* (2006.01)

(56) References Cited

U.S. PATENT DOCUMENTS

| | | | | |
|---|---|---|---|---|
| 8,353,225 B2 * | 1/2013 | Mori | ............... | F16H 25/20 |
| | | | | 74/89.32 |
| 8,925,408 B2 * | 1/2015 | Sakai | ............... | H02K 7/06 |
| | | | | 74/89.33 |

FOREIGN PATENT DOCUMENTS

| | | | |
|---|---|---|---|
| KR | 10-2007-0112519 A | 11/2007 | |
| KR | 10-0901162 B1 | 6/2009 | |
| KR | 10-1342980 B1 | 12/2013 | |
| KR | 10-1707206 B1 | 2/2017 | |
| WO | WO-9935419 A1 * | 7/1999 | ............ F16H 25/24 |

OTHER PUBLICATIONS

Korean office action dated Dec. 8, 2021 for Korean Application No. 10-2021-0133188.

* cited by examiner

LINEAR ROBOT AND METHOD OF MANUFACTURING THE SAME

CROSS REFERENCE TO RELATED APPLICATION

The present application claims priority of Korean Patent Application No. 10-2021-0133188 filed on Oct. 7, 2021, the entire contents of which is incorporated herein for all purposes by this reference.

BACKGROUND OF THE DISCLOSURE

Field of the Disclosure

The present disclosure relates to a linear robot and a method of manufacturing the same.

Description of the Related Art

A process in which an operator transfers an object from a first position to a second position in an industrial environment is not regularly performed, and the transfer process may be performed over a long period of time. In addition, there may occur a problem in that the operator cannot transport a transfer target object because of a weight of the transfer target object.

Therefore, a transfer robot has been developed and used to quickly transfer a heavy-weight object from the first position to the second position. The transfer robot may be a linear robot that linearly moves the transfer target object. The transfer robot has an advantage in that the transfer robot may quickly transfer the transfer target object and stably transfer a heavy-weight object.

Meanwhile, during a process of manufacturing the transfer robot in the related art, a guide rail is manufactured by performing processing such as cutting or extrusion on a single body. However, in the case of the manufacturing method in the related art, there is a problem in that it is difficult to manufacture the robot, manufacturing costs are increased, and an overall weight of the robot is increased, and the robot is difficult to operate at high speed in an industrial site.

To solve the problems, there has been proposed a method of separately manufacturing a guide rail unit along which a transfer block moves and disposing the guide rail unit in a main body. However, coupling strength for coupling the main body and the guide rail unit is low, which may cause a withdrawal of the guide rail and a breakdown of the entire robot.

DOCUMENT OF RELATED ART

Patent Document (Patent Document 1) KR 10-2007-0112519 A

SUMMARY OF THE DISCLOSURE

The present disclosure has been made in an effort to provide a linear robot in which a main body unit is not processed at one time to have a guide rail part and a guide rail unit is stably coupled to the main body unit.

The present disclosure has also been made in an effort to provide a linear robot in which an oil-storing sealing unit containing a lubricant is provided at one side of a transfer block unit, such that the transfer block unit smoothly moves from a first position to a second position or from the second position to the first position.

The present disclosure has also been made in an effort to provide a linear robot in which a main body unit and a guide rail unit are press-fitted and then cut into preset lengths, such that productivity is improved.

The present disclosure has also been made in an effort to provide a method of manufacturing the linear robot.

Technical problems of the present disclosure are not limited to the aforementioned technical problems, and other technical problems, which are not mentioned above, may be clearly understood by those skilled in the art from the following descriptions.

To achieve the above-mentioned objects, the present disclosure provides a linear robot including: a main body unit including a main body base part seated on a ground surface, and main body sidewall parts protruding in an upward direction by a predetermined thickness from two opposite sides of the main body base part, the main body unit having an internal space defined by the main body base part and the main body sidewall parts; a transfer block unit partially accommodated in the internal space of the main body unit, configured to linearly move in one direction, and having an upper portion on which a transfer target object is seated, the transfer block unit being configured to transfer the transfer target object from a first position to a second position; and a pair of guide rail units disposed between the main body unit and the transfer block unit, coupled to the main body unit, and configured to guide the transfer block unit, in which the main body sidewall parts each have a guide rail unit accommodation groove recessed by a predetermined length in a direction perpendicular to the upward direction, and at least a part of a surface of the guide rail unit accommodation groove has an uneven machined surface.

In addition, the guide rail unit accommodation groove may include: a first accommodation groove surface; a second accommodation groove surface formed to face the first accommodation groove surface and spaced apart from the first accommodation groove surface at a predetermined interval; and a third accommodation groove surface configured to connect the first accommodation groove surface and the second accommodation groove surface, and the third accommodation groove surface has the uneven surface.

In addition, the guide rail unit may include: a first guide rail unit surface corresponding to the first accommodation groove surface of the guide rail unit accommodation groove; a second guide rail unit surface corresponding to the second accommodation groove surface of the guide rail unit accommodation groove; and a third guide rail unit surface corresponding to the third accommodation groove surface of the guide rail unit accommodation groove, and the guide rail unit may be coupled to the main body unit by means of a bonding layer famed between the guide rail unit and the guide rail unit accommodation groove.

In addition, the main body unit and the guide rail unit may be made of different materials, and rigidity of the guide rail unit may be higher than rigidity of the main body unit.

In addition, the linear robot according to the present disclosure may further include: a pair of end block units configured to close two opposite ends of the main body unit and prevent the transfer block unit from separating in an axial direction of the main body unit, in which the guide rail unit includes guiding rail grooves configured to guide two opposite sides of the transfer block unit, a first end block unit of the pair of end block units, which is coupled to one end of the main body unit, includes a pair of first guide rail groove accommodation units protruding toward the main body unit, and a second end block unit of the pair of end block units, which is coupled to the other end of the main body unit, includes a pair of second guide rail groove accommodation units protruding toward the main body unit.

In addition, the linear robot may further include: a cover unit configured to cover upper sides of the pair of end block units and protect the internal space of the main body unit, in which an upper side of at least a part of a transfer block unit main body of the transfer block unit, which moves in the internal space, is covered by the cover unit, and a pair of upper extension portions protruding in the upward direction by a predetermined thickness from two opposite sides of the transfer block unit main body is exposed to the outside.

In addition, the transfer block unit may further include a transfer block endplate disposed on at least one end of a transfer block unit main body which is moved in the internal space of the main body unit, and the transfer block endplate selectively may come into contact with the end block unit.

In addition, the transfer block endplate may include therein an oil-storing sealing unit impregnated with a lubricant in advance, and the lubricant, which is pressed and discharged from the oil-storing sealing unit as the transfer block unit moves, may be applied onto at least a part of the transfer block unit.

In addition, the oil-storing sealing units may include: a first oil-storing sealing unit disposed at one side based on a hollow shaft of the transfer block endplate; and a second oil-storing sealing unit disposed at the other side based on the hollow shaft of the transfer block endplate.

In addition, the linear robot may further include: a sensing module coupled to a module coupling unit disposed on an outer surface of the main body sidewall part, the sensing module being configured to detect a position of the transfer block unit, in which the sensing module includes: a first position detection sensor configured to detect whether the transfer block unit is moved to the first position; and a second position detection sensor spaced apart by a predetermined distance from the first position detection sensor and configured to detect whether the transfer block unit is moved to the second position.

In addition, the main body unit and the pair of guide rail units may be press-fitted and bonded and then cut into a preset length.

The present disclosure also provides a method of manufacturing a linear robot, the method including: an extrusion step of manufacturing the main body unit through an extrusion process; a primary main body unit processing step of processing the main body unit so that the main body unit includes the main body base part and the main body sidewall parts; a secondary main body unit processing step of processing the main body unit to improve wear resistance and corrosion resistance; a tertiary main body unit processing step of processing the main body unit so that the main body unit includes the guide rail unit accommodation groove for accommodating the guide rail unit and at least a part of the guide rail unit accommodation groove has an uneven shape; a press-fitting and bonding step of forming a bonding layer in the guide rail unit accommodation groove of the main body unit and press-fitting and bonding the guide rail unit; a cutting step of cutting the main body unit and the guide rail unit together into a preset length after press-fitting and bonding the main body unit and the guide rail unit; and an assembly step of assembling the main body unit and the guide rail unit, which are cut, with the transfer block unit and the end block unit.

According to the above-mentioned technical solution and the following specific description, the main body sidewall part of the main body unit of the linear robot according to the present disclosure includes the guide rail unit accommodation groove configured to accommodate the guide rail unit, and a part of the surface of the guide rail unit accommodation groove is formed to have an uneven surface, such that the guide rail unit may be easily press-fitted and coupled into the guide rail unit accommodation groove. Therefore, the guide rail unit is securely bonded and coupled, which makes it possible to improve durability of the linear robot.

In addition, the transfer block endplate of the linear robot according to the present disclosure includes therein the oil-storing sealing unit impregnated with a lubricant in advance, such that the lubricant is discharged when the oil-storing sealing unit is pressed as the transfer block unit moves, and the discharged lubricant may be applied onto at least a part of transfer block unit without supply of lubricant from the outside. Therefore, it is possible to continuously operate the linear robot without supply of lubricant and minimize the occurrence of frictional force that hinders the movement of the transfer block unit.

In addition, in the linear robot according to the present disclosure, the main body unit and the guide rail unit are press-fitted and bonded and then cut together into a preset length, which makes it possible to improve assembly properties and productivity of the linear robot according to the present disclosure.

In addition, in the method of manufacturing the linear robot according to the present disclosure, the main body unit and the guide rail unit, which have a length longer than a length of the main body unit and the guide rail unit constituting the single linear robot, are press-fitted and bonded and then cut, which makes it possible to improve assembly properties and productivity of the linear robot.

DETAILED DESCRIPTION OF THE DISCLOSURE

Figure 1:
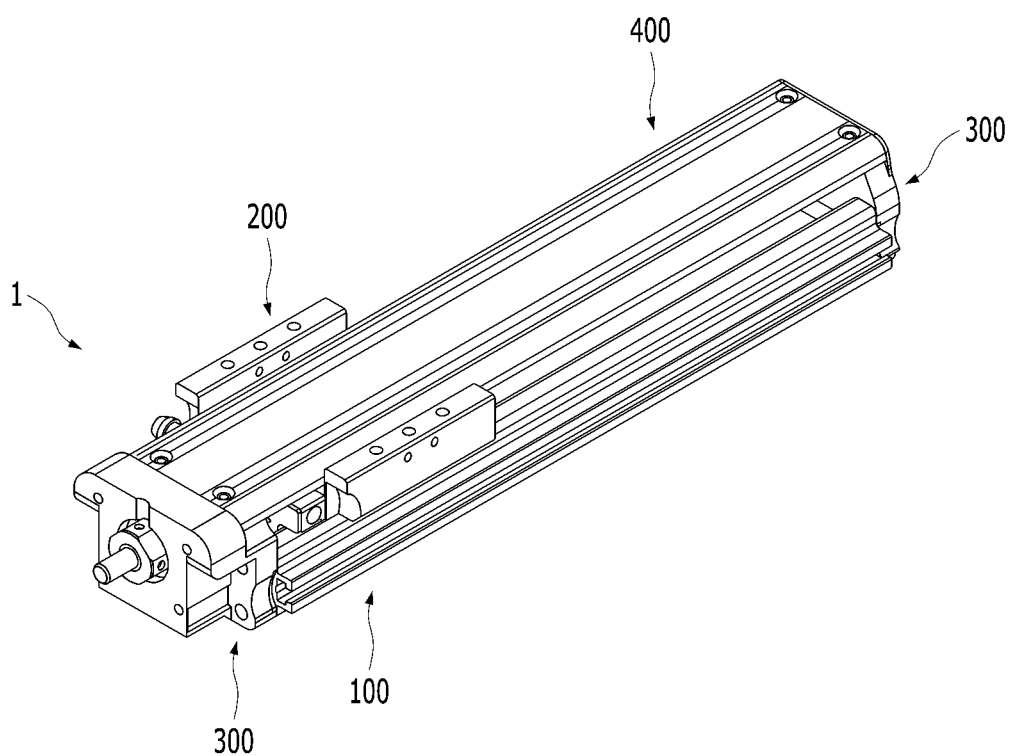
FIG. 1 is a view illustrating a linear robot according to an embodiment of the present disclosure.

Hereinafter, some embodiments of the present disclosure will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. Further, in the following description of the embodiments of the present disclosure, a detailed description of publicly known configurations or functions incorporated herein will be omitted when it is determined that the detailed description obscures the subject matters of the embodiments of the present disclosure.

In addition, the terms first, second, A, B, (a), and (b) may be used to describe constituent elements of the exemplary embodiments of the present disclosure. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present application.

FIG. 1 is a view illustrating a linear robot 1 according to an embodiment of the present disclosure.

The linear robot 1 serves to transfer a transfer target object (not illustrated) from a first position to a second position. The linear robot 1 solves a limitation in manually transferring the transfer target object in the related art. The linear robot 1 may be easily applied to various scales of industrial sites. In particular, the linear robot 1 may be used to quickly transfer the transfer target object in a factory.

The linear robot 1 according to the embodiment of the present disclosure includes a main body unit 100, a transfer block unit 200, end block units 300, and a cover unit 400. In addition, the linear robot 1 may include detailed configuration elements of the constituent elements listed above and may further include additional constituent elements.

Hereinafter, the respective constituent elements of the linear robot 1 according to the embodiment of the present disclosure will be described in more detail.

Figure 2:
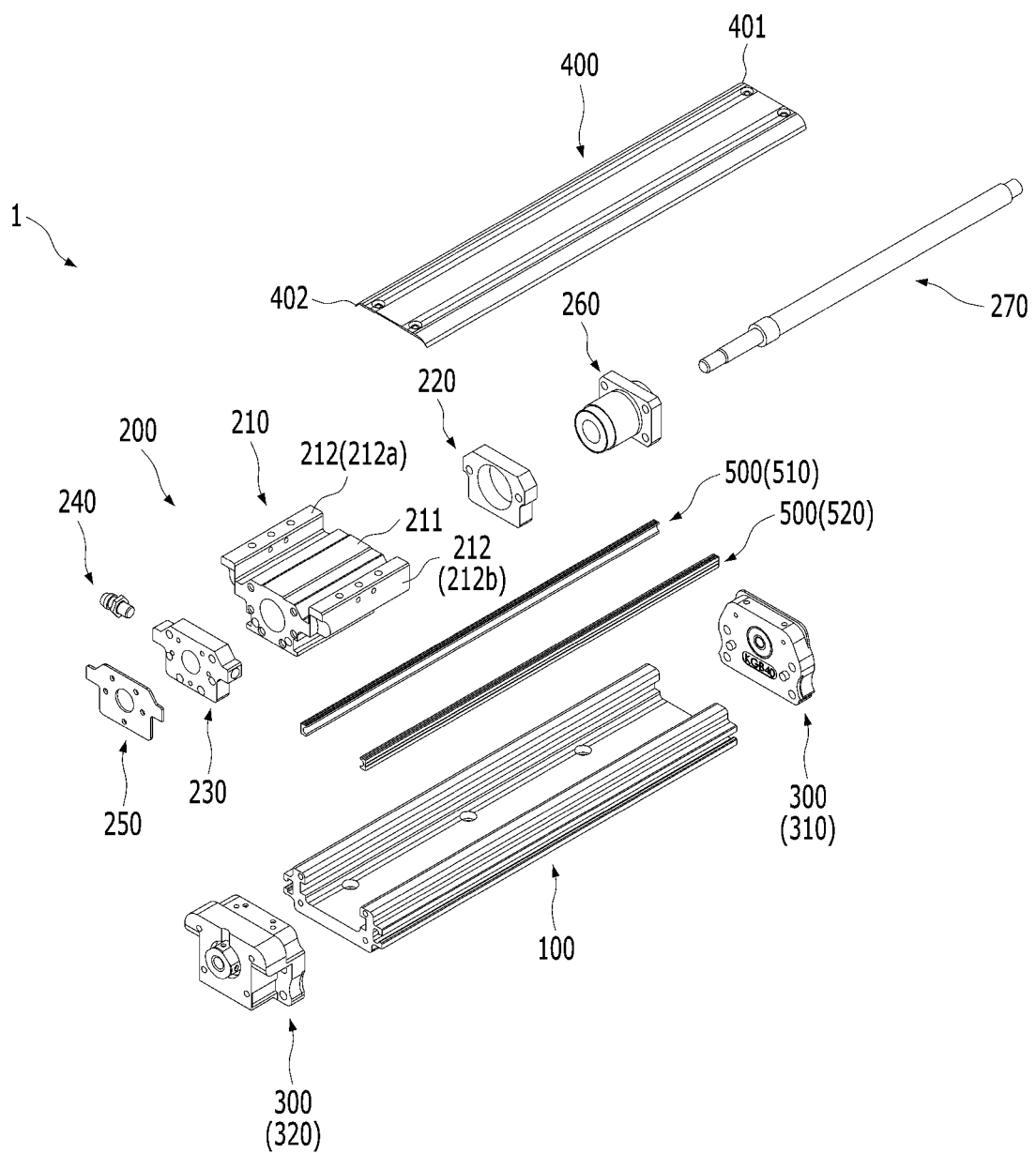
FIG. 2 is an exploded perspective view of the linear robot illustrated in FIG. 1.
Figure 3:
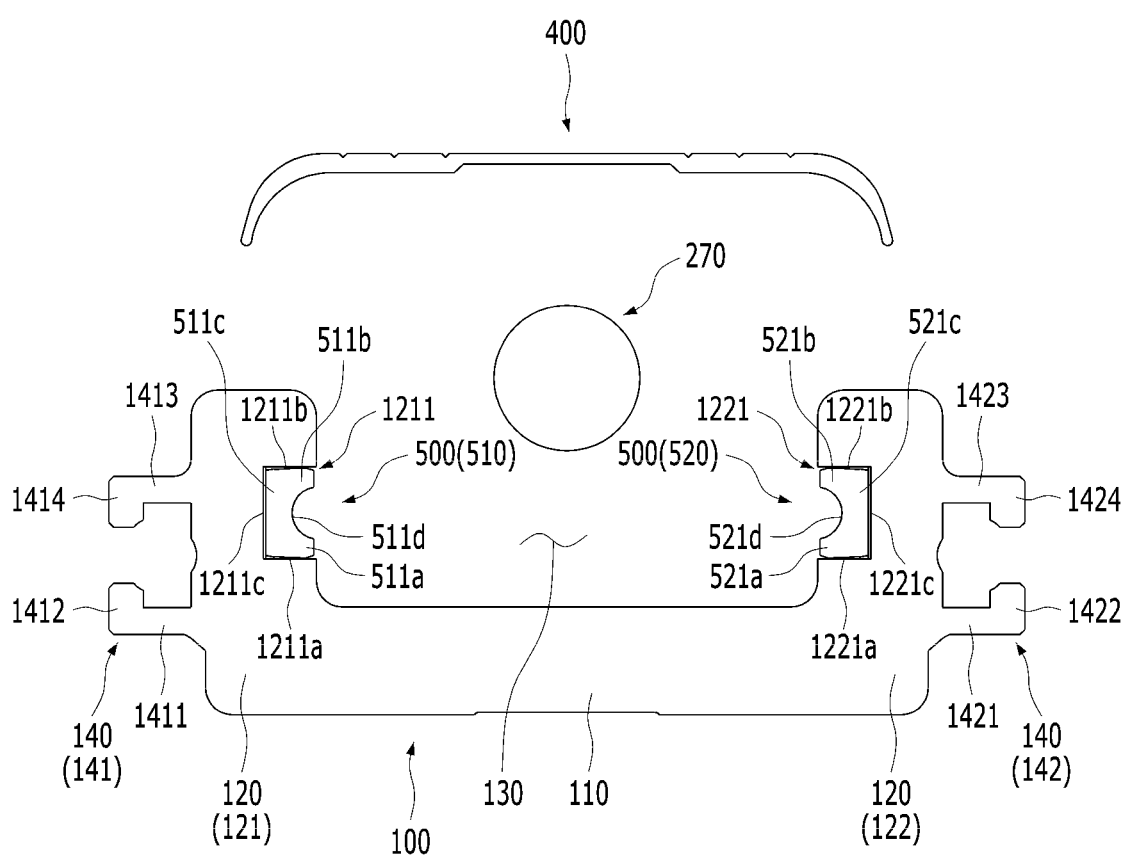
FIG. 3 is a view for explaining a main body unit and a guide rail unit of the linear robot illustrated in FIG. 1.
Figure 4:
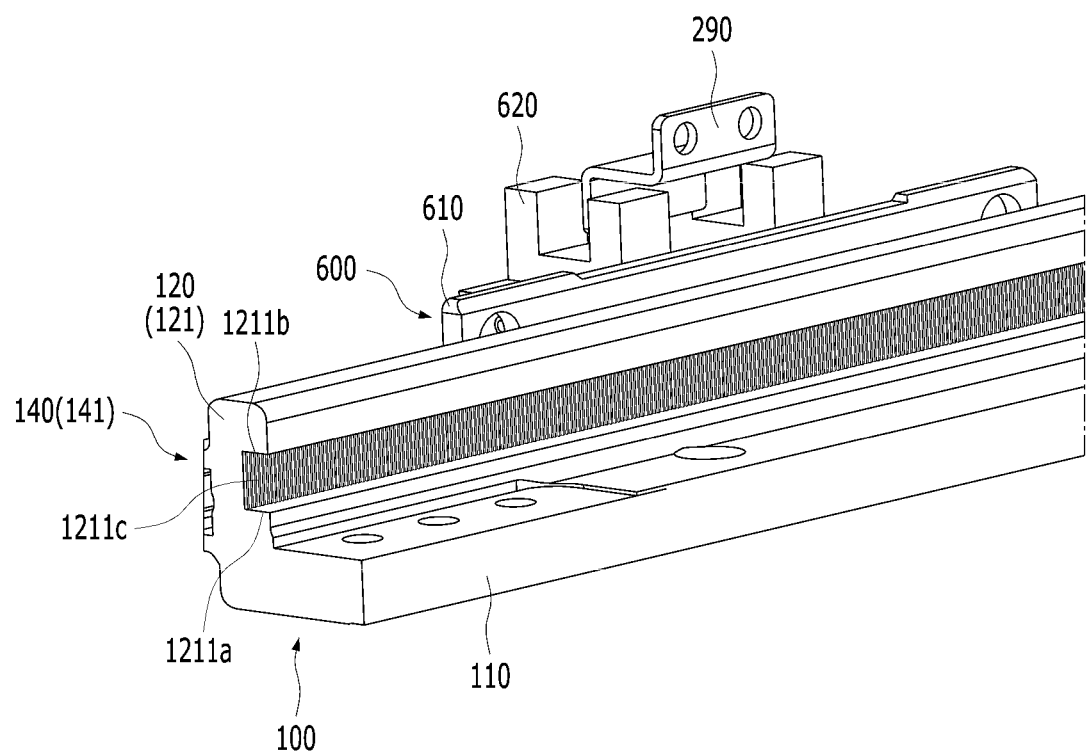
FIG. 4 is a view for explaining a guide rail unit accommodation groove of the main body unit of the linear robot illustrated in FIG. 1.

FIG. 2 is an exploded perspective view of the linear robot 1 illustrated in FIG. 1, FIG. 3 is a view for explaining the main body unit 100 and guide rail units 500 of the linear robot 1 illustrated in FIG. 1, and FIG. 4 is a view for explaining guide rail unit accommodation grooves 1211 of the main body unit 100 of the linear robot 1 illustrated in FIG. 1.

Referring to FIGS. 1 to 4, the linear robot 1 according to the embodiment of the present disclosure includes the main body unit 100. The main body unit 100 defines an external appearance of the linear robot 1. The main body unit 100, together with the cover unit 400 to be described below, may safely protect at least a part of the transfer block unit 200 from an external environment. For example, the main body unit 100 may protect the transfer block unit 200 from external impact or vibration. In addition, the main body unit 100 may also prevent chemical corrosion that may be applied to the transfer block unit 200, and the main body unit 100 may minimize an inflow of dust to allow the transfer block unit 200 to move smoothly.

The structure of the main body unit 100 will be described in more detail. The main body unit 100 includes a main body base part 110 seated on the ground surface. The main body base part 110 is seated on the ground surface to stably install the linear robot 1.

In addition, main body sidewall parts 120 protrude from two opposite sides of the main body base part 110. The main body sidewall parts 120 include a first main body sidewall part 121 protruding upward from one side of the main body base part 110 by a predetermined thickness, and a second main body sidewall part 122 protruding upward from the other side of the main body base part 110 by a predetermined thickness. The guide rail units 500, along which the movement of the transfer block unit 200 is guided, are coupled to the main body sidewall parts 120 and restrict the movement of the transfer block unit 200. Therefore, the transfer block unit 200 may accurately transfer the transfer target object without deviating from a predetermined route. Since the main body unit 100 includes the main body base part 110 and the main body sidewall parts 120 as described above, an internal space 130 may be formed. The internal space 130 accommodates at least a part of the transfer block unit 200 and protects the transfer block unit 200.

The main body sidewall parts 120 include guide rail unit accommodation grooves 1211 and 1221 recessed by a predetermined length in a direction perpendicular to the upward direction. The guide rail unit accommodation grooves 1211 and 1221 provide spaces into which the guide rail units 500 to be described below are inserted and coupled.

The guide rail unit accommodation grooves 1211 and 1221 may include first accommodation groove surfaces 1211a and 1221a, respectively. The first accommodation groove surfaces 1211a and 1221a may each have a normal vector corresponding to the main body base part 110. However, the present disclosure is not necessarily limited thereto, and the first accommodation groove surfaces 1211a and 1221a may be inclined at a predetermined angle with respect to the main body base part 110. In addition, the guide rail unit accommodation grooves 1211 and 1221 may respectively include second accommodation groove surfaces 1211b and 1221b facing the first accommodation groove surfaces 1211a and 1221a and spaced apart from the first accommodation groove surfaces 1211a and 1221a at predetermined intervals. With the first accommodation groove surfaces 1211a and 1221a and the second accommodation groove surfaces 1211b and 1221b, the guide rail unit accommodation grooves 1211 and 1221 may provide an appropriate height that allows the guide rail units 500 to be securely accommodated in the guide rail unit accommodation grooves 1211 and 1221. In addition, the guide rail unit accommodation grooves 1211 and 1221 may respectively include third accommodation groove surfaces 1211c and 1221c configured to connect the first accommodation groove surfaces 1211a and 1221a and the second accommodation groove surfaces 1211b and 1221b. That is, outer surfaces of the guide rail units 500 may be stably accommodated and protected in the guide rail unit accommodation grooves 1211 and 1221 by the first accommodation groove surfaces 1211a and 1221a, the second accommodation groove surfaces 1211b and 1221b, and the third accommodation groove surfaces 1211c and 1221c.

In this case, at least a part of the surface, among the first accommodation groove surfaces 1211a and 1221a, the second accommodation groove surfaces 1211b and 1221b, and the third accommodation groove surfaces 1211c and 1221c constituting the guide rail unit accommodation grooves 1211 and 1221, may have an uneven machined surface. In more detail, a partial area of each of the guide rail unit accommodation grooves 1211 and 1221 may have a regular or irregular uneven surface shape. The uneven surface shape may include a zigzag shape or a dotted shape, and at least one of various shapes having concave portions and convex portions may be applied to the uneven surface shape. As exemplarily illustrated in FIG. 4, the third accommodation groove surface 1211c of the first guide rail unit accommodation groove 1211 of the guide rail unit accommodation grooves 1211 and 1221 has an uneven machined surface.

If the surfaces of the guide rail unit accommodation grooves 1211 and 1221 are flat, it is difficult to press-fit the guide rail units 500 into the guide rail unit accommodation grooves 1211 and 1221, and a bonding force for coupling the guide rail units 500 to the guide rail unit accommodation grooves 1211 and 1221 is low, which may cause a problem of the separation of the guide rail units 500. Therefore, some surfaces of the guide rail unit accommodation grooves 1211 and 1221 have coarse uneven surfaces, such that the contact surface areas between the guide rail units 500 and the guide rail unit accommodation grooves 1211 and 1221 may increase to be larger than the surface areas of the guide rail unit accommodation grooves 1211 and 1221 before the machining, which reduces a likelihood that the guide rail units 500 will separate from the guide rail unit accommodation grooves 1211 and 1221. Therefore, the overall lifespan of the linear robot 1 increases, and the linear robot 1 is easy to maintain and repair.

Figure 5:
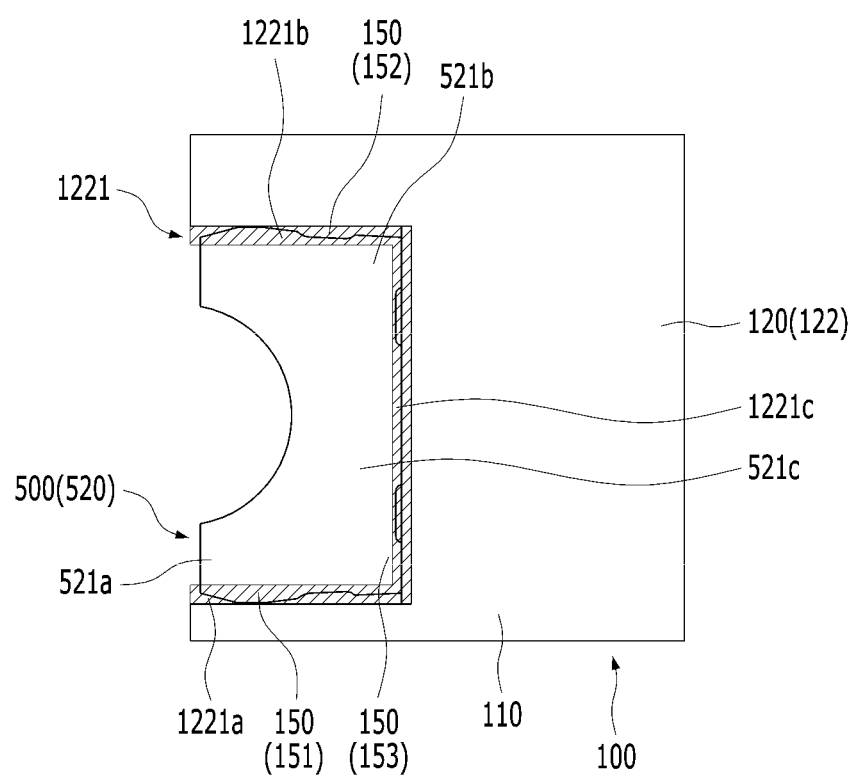
FIG. 5 is a view for explaining a state in which the guide rail unit is coupled to the main body unit.

FIG. 5 is a view for explaining a state in which the guide rail unit 500 is coupled to the main body unit 100.

A process of coupling the guide rail unit 500 to the main body unit 100 will be described in more detail with reference to FIGS. 1 to 5.

The linear robot 1 according to the embodiment of the present disclosure includes the pair of guide rail units 500. The guide rail units 500 provides a route along which the transfer block unit 200 is guided. The guide rail units 500 are coupled to the main body unit 100. In more detail, the guide rail units 500 are accommodated in and coupled to the guide rail unit accommodation grooves 1211 and 1221 formed in the main body sidewall parts 120. That is, the guide rail units 500 are disposed between the main body unit 100 and the transfer block unit 200 and guide the transfer block unit 200.

The number of guide rail units 500 may correspond to the number of main body sidewall parts 120. For example, the guide rail units 500 may include a first guide rail unit 510 accommodated in and coupled to the first guide rail unit accommodation groove 1211 of the first main body sidewall part 121, and a second guide rail unit 520 accommodated in and coupled to the second guide rail unit accommodation groove 1221 of the second main body sidewall part 122. As described above, the pair of guide rail units 500 has been described, but the present disclosure is not necessarily limited thereto. As necessary, a plurality of guide rail unit accommodation grooves 1211 and 1221 may be recessed in the single main body sidewall part 120, and the guide rail units 500 may be accommodated in and coupled to the guide rail unit accommodation grooves 1211 and 1221, respectively.

A process of accommodating and coupling the guide rail units 500 into the guide rail unit accommodation grooves 1211 and 1221, together with the detailed configuration of the guide rail units 500, will be described in detail. As illustrated in FIGS. 3 and 5, the guide rail units 500 may include the first guide rail unit 510 and the second guide rail unit 520.

To couple the guide rail units 500, the main body unit 100 is manufactured by extrusion first. A process of manufacturing the main body unit 100 by extrusion may mean a process of manufacturing the main body unit 100 by extrusion so that the main body unit 100 has a length longer than a length of the main body unit 100 that constitutes the single linear robot 1 according to the present disclosure. As described below, the main body unit 100 manufactured by extrusion is cut into a preset unit length through a subsequent cutting process and then assembled to constitute the single linear robot 1.

After the process of manufacturing the main body unit 100 by extrusion, a process of primarily processing the main body unit 100 may be performed. The process of primarily processing the main body unit 100 may be performed by a cutting process. The main body base part 110 and the main body sidewall parts 120 may be manufactured by the primarily processing process. Therefore, the main body unit 100 has the internal space 130.

Thereafter, secondary processing (post-process) is performed on the main body unit 100. In more detail, the process (post-process) of secondarily processing the main body unit 100 may be a process of anodizing the main body unit 100. Wear resistance and corrosion resistance of the main body unit 100 may be improved by anodizing the main body unit 100.

Thereafter, tertiary processing may be performed on the main body unit 100. During the process of tertiarily processing the main body unit 100, the guide rail unit accommodation grooves 1211 and 1221 may be recessed by a predetermined length into the main unit sidewall parts 120. In addition, some surfaces of the guide rail unit accommodation grooves 1211 and 1221 may be additionally processed to have an uneven surface.

After the tertiary processing on the main body unit 100 is completed, the guide rail units 500 are accommodated, press-fitted, bonded, and coupled into the guide rail unit accommodation grooves 1211 and 1221. In this case, the guide rail units 500 may include first guide rail unit surfaces 511a and 521a corresponding to the first accommodation groove surfaces 1211a and 1221a, second guide rail unit surfaces 511b and 521b corresponding to the second accommodation groove surfaces 1211b and 1221b, and third guide rail unit surfaces 511c and 521c corresponding to the third accommodation groove surfaces 1211c and 1221c. That is, since the guide rail units 500 having shapes corresponding to the shapes of the guide rail unit accommodation grooves 1211 and 1221 are press-fitted, the guide rail units 500 may be securely coupled to the guide rail unit accommodation grooves 1211 and 1221.

Meanwhile, the guide rail units 500 may be coupled to the main body unit 100 by means of bonding layers 150 formed between the guide rail units 500 and the guide rail unit accommodation grooves 1211 and 1221. In more detail, adhesive means is applied onto the guide rail unit accommodation grooves 1211 and 1221 of the main body units 100 on which the tertiary processing has been completely performed. Then, the guide rail units 510 and 520 are press-fitted into the guide rail unit accommodation grooves 1211 and 1221, respectively, and then left unattended for a predetermined time, so that the bonding layers 150 are stabilized. The predetermined time may be 12 hours or more, for example. In this case, the guide rail unit 500 may have a length corresponding to a length of the main body unit 100 manufactured by extrusion.

Meanwhile, the bonding layers 150 include one side bonding layer configured to bond the first guide rail unit 510 to the main body unit 100, and the other side bonding layer configured to bond the second guide rail unit 520 to the main body unit 100. In addition, the bonding layers 150 may include first bonding layers 151 formed between the first accommodation groove surfaces 1211a and 1221a and the first guide rail unit surfaces 511a and 521a, second bonding layers 152 formed between the second accommodation groove surfaces 1211b and 1221b and the second guide rail unit surfaces 511b and 521b, and third bonding layers 153 formed between the third accommodation groove surfaces 1211c and 1221c and the third guide rail unit surfaces 511c and 521c. In this case, the third bonding layer 153 may be thicker than the first bonding layer 151 and the second bonding layer 152. That is, the third bonding layer 153 may be formed on the portion where the uneven surface is formed, and the adhesive means may be formed with a larger thickness on the uneven surface. Therefore, the guide rail units 500 may be more stably kept bonded and attached to the guide rail unit accommodation grooves 1211 and 1221.

Meanwhile, the guide rail unit 500 and the main body unit 100 may be made of different materials. The rigidity of the guide rail unit 500 may be higher than the rigidity of the main body unit 100. For example, the guide rail unit 500 may be made of iron (steel), and the main body unit 100 may be made of aluminum or aluminum alloy. That is, the guide rail unit 500 is a portion by which at least a part of the transfer block unit 200 is guided. Therefore, the guide rail unit 500 needs to be made of a material with high wear resistance. However, if the entire linear robot 1 is made of iron, a weight of the linear robot 1 increases, the linear robot 1 is difficult to install in the industrial site, and manufacturing costs also increase. Therefore, the main body unit 100 may be made of aluminum relatively lighter in weight than iron, thereby reducing an overall weight of the linear robot 1 and ensuring durability of the guide rail unit. In addition, manufacturing costs of the linear robot 1 may be reduced, the linear robot 1 may be easy to install, and the lightweight linear robot 1 may be used to quickly transfer the transfer target object from the first position to the second position (or vice versa).

After the guide rail units 500 are stably press-fitted into and bonded to the main body unit 100, the main body unit 100 and the guide rail units 500, which are coupled to one another, may be cut into preset lengths. That is, the structure in which the main body units 100 and the guide rail unit 500 are press-fitted and bonded may be cut into pieces that may be used to manufacture a plurality of linear robots according to the present disclosure. The main body unit 100 and the guide rail units 500, while have been subjected to the cutting process, are assembled with the transfer block 200, the end block units 300, and the cover unit 400 and constitute the linear robot. The aforementioned series of processing processes may improve assembly properties and productivity of the linear robot according to the present disclosure.

Hereinafter, the transfer block unit 200 will be described.

The linear robot 1 according to the embodiment of the present disclosure includes the transfer block unit 200. The transfer block unit 200 is partially accommodated in the internal space 130 of the main body unit 100 and linearly moves in one direction (in more detail, an axial or longitudinal direction of the main body unit 100). The transfer target object is seated on an upper portion of the transfer block unit 200, and the transfer block unit 200 transfers the transfer target object from the first position to the second position. The transfer block unit 200 may substantially and further include a transfer block unit main body 210 having the upper portion on which the transfer target object is seated, and transfer block endplates 220 and 230 disposed at one or more ends of the transfer block unit main body 210. In more detail, the transfer block endplates 220 and 230 may include a first transfer block endplate 220 disposed at one end of the transfer block unit main body 210, and a second transfer block endplate 230 disposed at the other end of the transfer block unit main body 210. The transfer block endplates 220 and 230 may accommodate at least one of a ball screw nut 260 and a ball screw bolt 270. In addition, the transfer block endplates 220 and 230 may prevent a direct collision of the transfer block unit main body 210 and reduce an impact force caused by an unintended collision when the transfer block unit main body 210 moves. In more detail, a protruding portion of the ball screw nut 260 and the ball screw bolt 270 may penetrate a hollow portion of the first transfer block endplate 220, and the ball screw bolt 270 may penetrate a hollow portion of the second transfer block endplate 230.

In addition, the transfer block unit main body 210 has a transfer block unit center main body portion 211 having a hollow portion and accommodated in the internal space 130 of the main body unit 100. A pair of upper extension portions 212 may be formed at two opposite sides of the transfer block unit main body 210, and the pair of upper extension portions 212 may protrude upward by a predetermined thickness from the two opposite sides of the transfer block unit main body 210. The upper extension portions 212 may include a first upper extension portion 212a formed at one side of the transfer block unit main body 210, and a second upper extension portion 212b formed at the other side of the transfer block unit main body 210.

Hereinafter, the end block units 300 configured to close two opposite ends of the main body unit 100 will be described.

Figure 6:
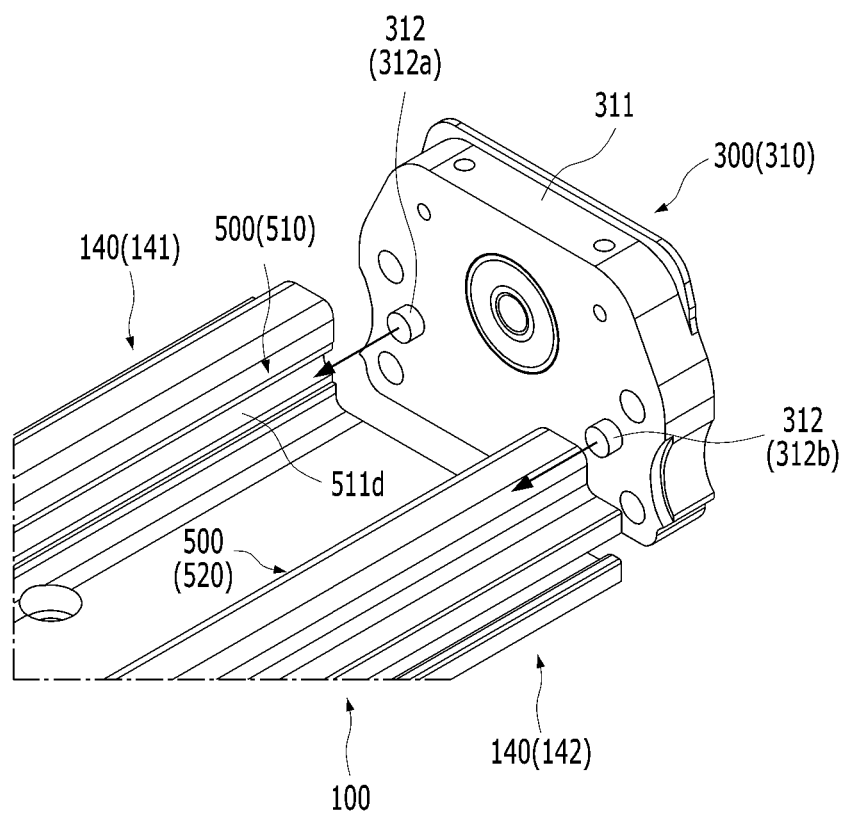
FIG. 6 is a view for explaining a first end block unit of end block units which are components of the linear robot illustrated in FIG. 1.
Figure 7:
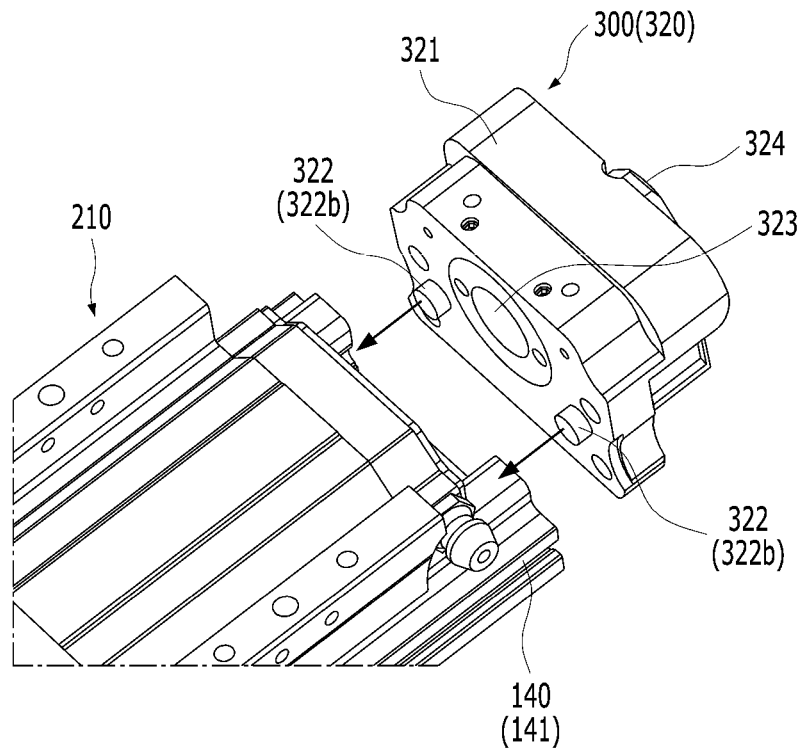
FIG. 7 is a view for explaining a second end block unit of the end block units which are the components of the linear robot illustrated in FIG. 1.

FIG. 6 is a view for explaining a first end block unit 310 of the end block units 300 which are components of the linear robot 1 illustrated in FIG. 1, and FIG. 7 is a view for explaining a second end block unit 320 of the end block units 300 which are the components of the linear robot 1 illustrated in FIG. 1.

Referring to FIGS. 1, 2, 6, and 7, the linear robot 1 according to the embodiment of the present disclosure may further include the pair of end block units 300 configured to close the two opposite ends of the main body unit 100 and prevent the transfer block unit 200 from separating from the main body unit 100 in the axial direction (or the longitudinal direction). For example, the end block units 300 may include the first end block unit 310 configured to close one end of the main body unit 100, and the second end block unit 320 configured to close the other end of the main body unit 100 which facing the first end block unit 310. For example, when the transfer block unit 200 (more particularly, the transfer block unit main body 210) moves from the first position to the second position, the first end block unit 310 may collide with the transfer block unit 200 when the transfer block unit 200 moves beyond a preset distance. In more detail, the first end block unit 310 may selectively come into contact with the first transfer block endplate 220. Therefore, it is possible to prevent the transfer block unit 200 from unexpectedly operating and separating from the main body unit 100.

Likewise, when the transfer block unit 200 (more particularly, the transfer block unit main body 210) moves from the second position to the first position, the second end block unit 320 may collide with the transfer block unit 200 when the transfer block unit 200 moves beyond a preset distance. In more detail, the second end block unit 320 may selectively come into contact with the second transfer block endplate 230. Alternatively, the second end block unit 320 may selectively come into contact with a cover block endplate 250 configured to cover the second transfer block endplate 230. Therefore, it is possible to prevent the transfer block unit 200 from unexpectedly operating and separating from the main body unit 100.

Hereinafter, a structure in which the end block units 300 are coupled to the main body unit 100 will be described.

The end block units 300 may include a pair of guide rail groove accommodation units 312 and 322 protruding from end block units 311 and 321 toward the main body unit 100. In more detail, the guide rail units 500 include guiding rail grooves 511d and 521d for guiding the two opposite sides of the transfer block unit 200. The first end block unit 310 includes a pair of first guide rail groove accommodation units 312 protruding toward the main body unit 100. The first guide rail groove accommodation units 312 may include one side first guide rail groove accommodation unit 312a and the other side first guide rail groove accommodation unit 312b. The first guide rail groove accommodation units 312 may have shapes corresponding to shapes of the guiding rail grooves 511d and 521d. The first guide rail groove accommodation units 312 may be accommodated in the guiding rail grooves 511d and 521d, thereby easily preventing the separation of the transfer block unit 200.

Likewise, the second end block unit 320 includes a pair of second guide rail groove accommodation units 322 protruding toward the main body unit 100. The second guide rail groove accommodation units 322 may include one side second guide rail groove accommodation unit 322a and the other side second guide rail groove accommodation unit 322b. The second guide rail groove accommodation units 322 may have shapes corresponding to shapes of the guiding rail grooves 511d and 521d. The second guide rail groove accommodation units 322 may be accommodated in the guiding rail grooves 511d and 521d, thereby easily preventing the separation of the transfer block unit 200.

In this case, the first guide rail groove accommodation units 312 may be integrated with the first end block unit 310, and the second guide rail groove accommodation units 322 may be integrated with the second end block unit 320. Since the first guide rail groove accommodation units 312 and the second guide rail groove accommodation units 322 are integrated with the first end block unit 310 and the second end block unit 320, respectively, there is a technical advantage in that assembly properties are improved in comparison with a guide rail groove accommodation unit provided on an end block unit by bolting in the related art.

Hereinafter, the cover unit 400, which is the component of the linear robot 1, will be described.

Referring to FIGS. 1 to 3, the linear robot 1 according to the embodiment of the present disclosure may further include the cover unit 400. The cover unit 400 may cover upper sides of the pair of end block units 300 and protect the internal space 130 of the main body unit 100. That is, the components of the transfer block unit 200, which are accommodated in the internal space 130 and moved in the internal space 130, are protected from the external environment. For example, the transfer block unit center main body portion 211, the transfer block endplates 220 and 230, the ball screw nut 260, and the ball screw bolt 270 may be protected from the external environment by the main body unit 100 and the cover unit 400. However, the upper extension portions 212 of the transfer block unit main body 210 are exposed to the outside by protruding upward from the cover unit 400. Therefore, the transfer target object may be seated on a tray or the like coupled to the upper extension portions 212.

Hereinafter, a linear robot 2 according to another embodiment of the present disclosure will be described in detail. In the description of the linear robot 2 according to another embodiment of the present disclosure, the configuration identical to the configuration of the linear robot 1 according to the above-mentioned embodiment of the present disclosure will be briefly described or a repeated description thereof will be omitted.

Figure 8:
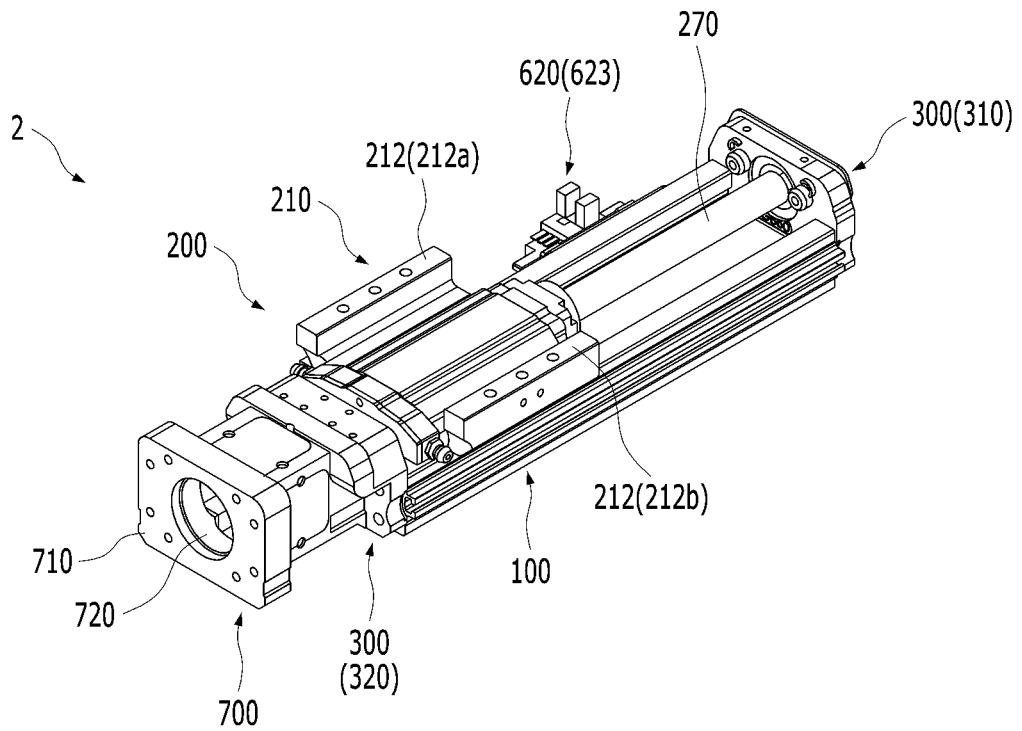
FIG. 8 is a view illustrating a linear robot according to another embodiment of the present disclosure.
Figure 9:
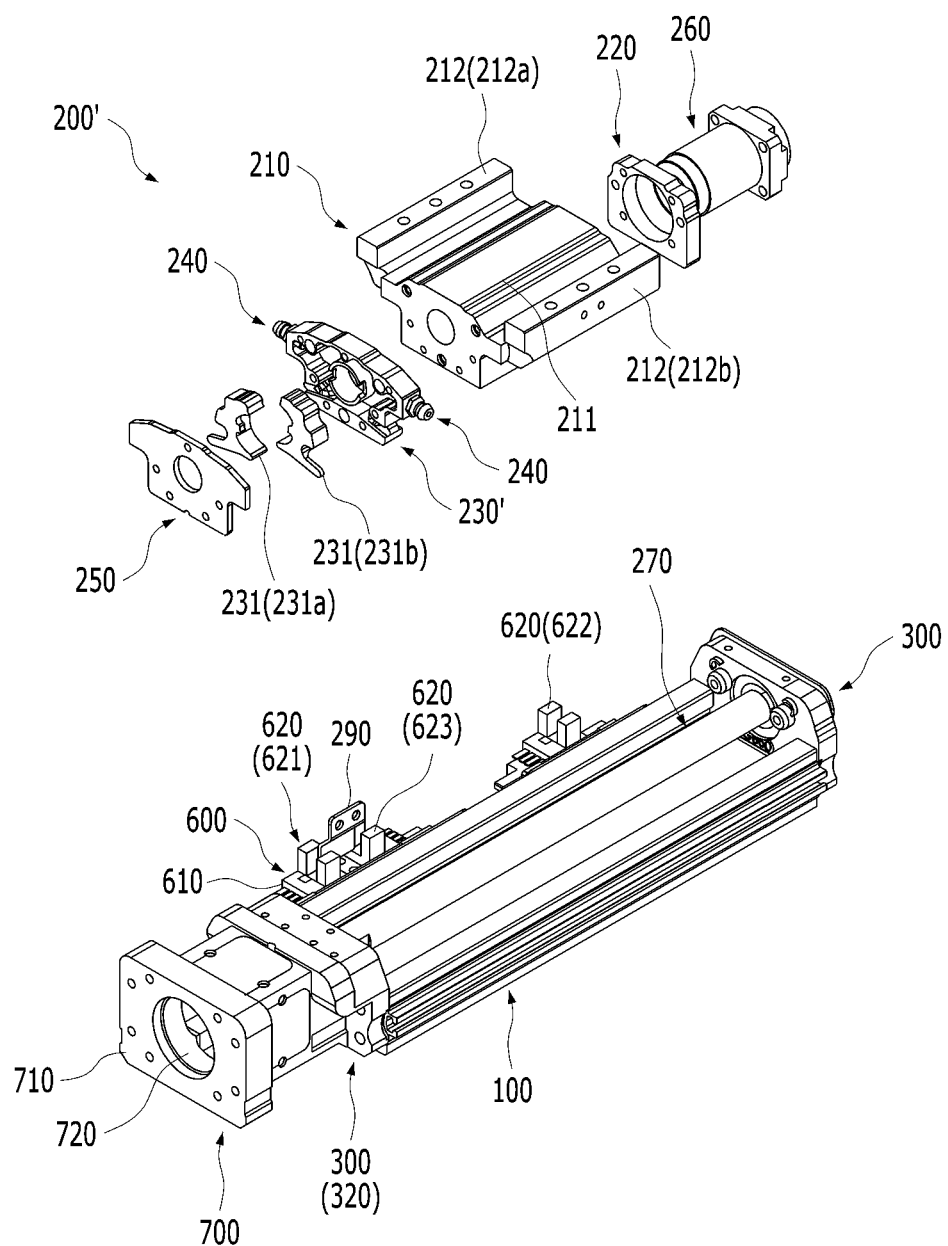
FIG. 9 is an exploded perspective view of the linear robot illustrated in FIG. 8.

FIG. 8 is a view illustrating the linear robot 2 according to another embodiment of the present disclosure, and FIG. 9 is an exploded perspective view of the linear robot 2 illustrated in FIG. 8.

Referring to FIGS. 8 and 9, similar to the linear robot 1 according to the above-mentioned embodiment, the linear robot 2 according to another embodiment of the present disclosure includes the main body unit 100, the end block units 300, and the like. Although not separately illustrated in respect to the linear robot 1 according to the embodiment of the present disclosure, a motor connection part 700 may be provided on one surface of the second end block unit 320. The motor connection part 700 may include a motor connection part main body 710 and the shaft connection opening 720. A motor may be connected to the linear robot 1 or 2 through the shaft connection opening 720 and transfer the transfer block unit 200 from the first position to the second position (or vice versa).

However, the linear robot 2 according to another embodiment of the present disclosure includes a transfer block unit 200' somewhat different from that of the linear robot 1 according to the embodiment of the present disclosure. In more detail, at least one of the transfer block endplates 220 and 230 of the transfer block unit 200' may include oil-storing sealing units 231 impregnated with a lubricant in advance. The oil-storing sealing unit 231 may be configured by a porous elastic member and contain a liquid.

The oil-storing sealing units 231 may be disposed in the transfer block endplates 220 and 230 having structures capable of accommodating the oil-storing sealing units 231. The oil-storing sealing units 231 may be pressed as the transfer block unit 200' (in more detail, the transfer block unit main body 210) moves, and the lubricant contained in the oil-storing sealing units 231 may be discharged as the oil-storing sealing units 231 are pressed. The discharged lubricant may be applied onto at least a part of the transfer block unit 200. For example, the lubricant may be applied onto the hollow portion of the transfer block unit main body 210 and the hollow portions of the transfer block endplates 220 and 230 or applied onto the ball screw nut 260 and the ball screw bolt 270.

Therefore, a frictional force may be reduced by the lubricant applied onto at least a part of the transfer block unit 200', such that the transfer block unit 200' may stably transfer the transfer target object, and a lifespan of the linear robot 2 may increase.

In addition, the lubricant is not separately supplied from the outside, but supplied from the oil-storing sealing units 231 into the transfer block endplates 220 and 230. Therefore, it is possible to eliminate a process of unnecessarily stopping the operation and supplying the lubricant. Further, it is possible to continuously and stably use the linear robot 2 while minimizing the frictional force until the lubricant contained in the oil-storing sealing units 231 is completely consumed.

Meanwhile, the oil-storing sealing units 231 may include a first oil-storing sealing unit 231a provided at one side based on hollow shafts of the transfer block endplates 220 and 230, and a second oil-storing sealing unit 231b provided at the other side based on the hollow shafts of the transfer block endplates 220 and 230. That is, the oil-storing sealing unit 231 may have two or more divided parts and thus be easily inserted into at least one of the transfer block endplates 220 and 230.

Hereinafter, a configuration of a sensing module 600 capable of being additionally coupled to an outer surface of the main body unit 100 will be described.

Referring to FIG. 3, in the linear robot 1 or 2 according to the present disclosure, the main body unit 100 may further include module coupling units 140 provided on an outer surface of the main body sidewall parts 120. The module coupling unit 140 may be provided on at least one of the main body sidewall parts 120. For example, the module coupling units 140 may include a first module coupling unit 141 provided on an outer surface of the first main body sidewall part 121, and a second module coupling unit 142 provided on an outer surface of the second main body sidewall part 122. The module coupling units 140 may include first module extension portions 1411 and 1421, second module extension portions 1412 and 1422 bent at predetermined angles from the first module extension portions 1411 and 1421, third module extension portions 1413 and 1423 spaced apart from the first module extension portions 1411 and 1421 at predetermined intervals, and fourth module extension portions 1414 and 1424 bent at predetermined angles from the third module extension portions 1413 and 1423. In this case, the structure in which the second module extension portions 1412 and 1422 and the fourth module extension portions 1414 and 1424 are bent allows a module coupled to the module coupling units 140 to be coupled and decoupled only in the axial direction (or longitudinal direction) of the main body unit 100. Therefore, the shapes of the module coupling units 140 may maintain the stable state of the coupled module.

Meanwhile, referring to FIGS. 4, 8, and 9, the linear robot 1 or 2 according to the present disclosure may further include the sensing module 600 coupled to the module coupling units 140 are configured to contact a position of the transfer block unit 200. In more detail, the sensing module 600 may include a sensing module main body 610 mechanically coupled to the module coupling units 140, and one or more position detection sensors 620 provided on the sensing module main body 610. In more detail, the position detection sensors 620 may include a first position detection sensor 621 configured to detect whether the transfer block unit 200 is moved to the first position, and a second position detection sensor 622 spaced apart by a predetermined distance from the first position detection sensor 621 and configured to detect whether the transfer block unit 200 is moved to the second position.

For example, the position detection sensor 620 may be an optical detection sensor. When a position detection part 290, which extends from the transfer block unit main body 210 of the transfer block unit 200, passes through the position detection sensor 620, a light beam may be blocked by the position detection part 290. In this case, when the light beam is blocked, the position detection sensor 620 may detect that the transfer block unit 200 has reached the corresponding position. For example, when the transfer block unit 200, which has been present at the first position, moves and reaches the second position, the light beam emitted from the second position detection sensor 622 is blocked, and the second position detection sensor 622 may detect that the transfer block unit 200 has reached the second position. When the second position detection sensor 622 detect that the transfer block unit 200 has reached the second position, a control unit (not illustrated) electrically connected to the second position detection sensor 622 may apply a control signal to the motor configured to move the transfer block unit 200 and reduce a speed of the motor or stop the rotation of the motor. Therefore, it is possible to stably transfer the transfer target object while preventing the transfer block unit 200 from colliding with the first end block unit 310.

Likewise, when the transfer block unit 200, which has been present at the second position, moves and reaches the first position, the light beam emitted from the first position detection sensor 621 is blocked, and the first position detection sensor 621 may detect that the transfer block unit 200 has reached the first position. When the first position detection sensor 621 detect that the transfer block unit 200 has reached the first position, the control unit (not illustrated) electrically connected to the first position detection sensor 621 may apply a control signal to the motor configured to move the transfer block unit 200 and reduce a speed of the motor or stop the rotation of the motor. Therefore, it is possible to stably transfer the transfer target object while preventing the transfer block unit 200 from colliding with the second end block unit 320.

However, the number of position detection sensors 620 is not limited two. Three or more position detection sensors 620 including a third position detection sensor 623 may be provided. As the number of position detection sensors 620 increases, it is possible to more precisely control the position by detecting the position of the transfer block unit 200.

Hereinafter, a method of manufacturing the linear robot 1 or 2 according to the present disclosure will be described. However, the repeated description of the linear robot 1 or 2 will be briefly made or omitted.

Figure 10:
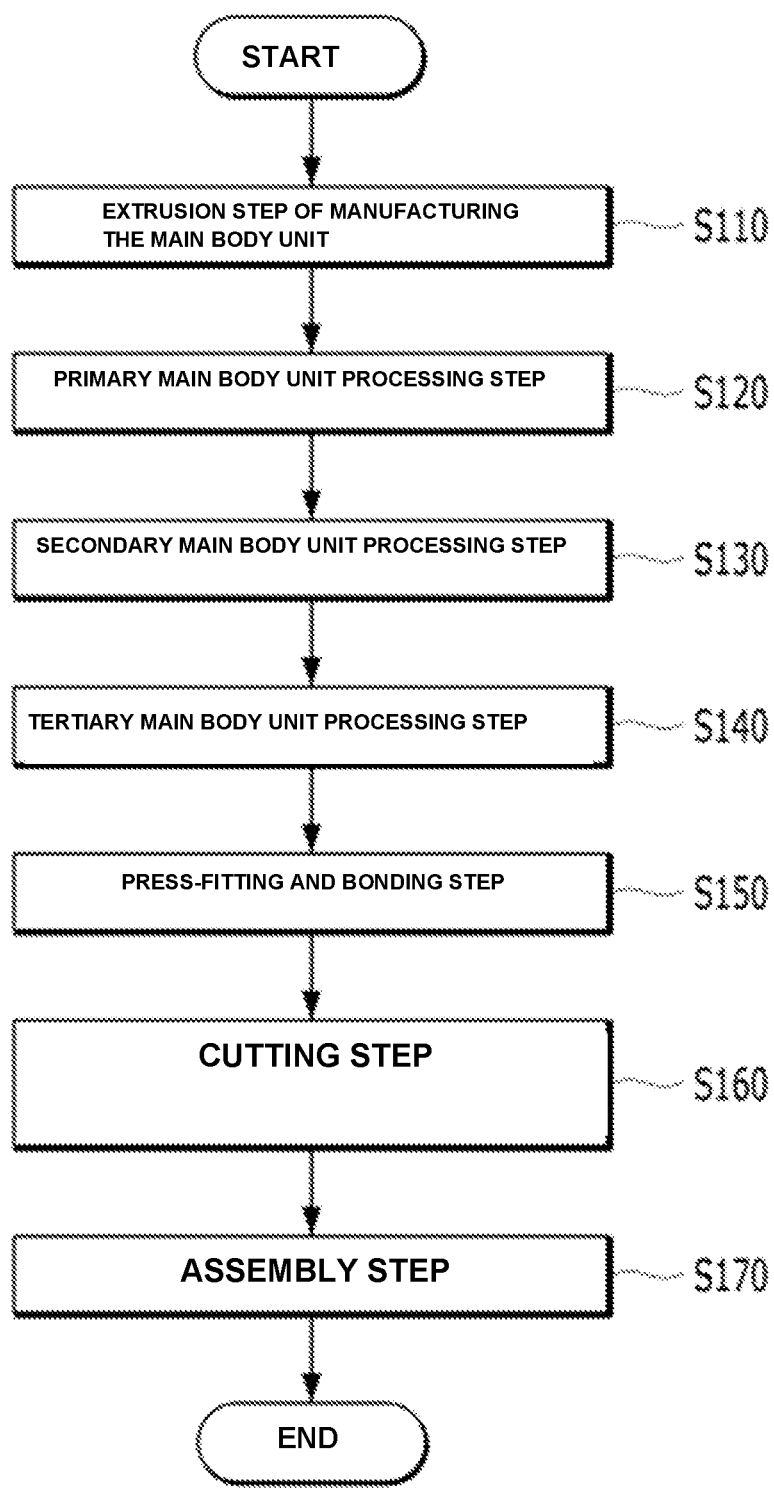
FIG. 10 is a flowchart illustrating a method of manufacturing the linear robot according to the present disclosure.

FIG. 10 is a flowchart illustrating a method of manufacturing the linear robot according to the present disclosure.

Referring to FIG. 10, the method of manufacturing the linear robot according to the present disclosure includes an extrusion step S110. In the extrusion step S110, the main body unit is manufactured by an extrusion process. For example, the main body unit may be made of aluminum.

In this case, the main body unit may be manufactured by extrusion to have a length longer than a length of the main body unit that constitutes the single linear robot. For example, when the length of the main body unit constituting the single linear robot according to the present disclosure is N (m), the length of the main body unit manufactured by the extrusion may be N×M (m). In this case, the letter 'M' may be a positive integer appropriately selected by a user, as necessary. That is, the user may manufacture the main body unit by extrusion so that the main body unit has the length of N×M (m) to manufacture M linear robots.

In addition, the method of manufacturing the linear robot according to the present disclosure includes a primary main body unit processing step S120 of processing the main body unit manufactured by extrusion so that the main body unit has the main body base part and the main body sidewall parts. In the primary main body unit processing step S120, the main body unit may be cut to have the main body base part and the main body sidewall parts, and the internal space may be defined by the main body base part and the main body sidewall parts.

In addition, the method of manufacturing the linear robot according to the present disclosure includes a secondary main body unit processing step S130. The secondary main body unit processing step S130 may be a step of performing predetermined treatment for improving wear resistance and corrosion resistance of the entire main body unit. In this case, the predetermined treatment may be an anodizing process. The aluminum material of the main body unit may be anodized and converted into aluminum oxide, and the aluminum oxide improves wear resistance and corrosion resistance in comparison with aluminum before oxidation.

In addition, the method of manufacturing the linear robot according to the present disclosure includes a tertiary main body unit processing step S140. In the tertiary main body unit processing step S130, a part of the main body sidewall part is cut to form the guide rail unit accommodation groove. The guide rail unit accommodation groove of the main body unit may accommodate the guide rail unit. The guide rail unit accommodation groove may be famed to have a shape corresponding to a shape of the guide rail unit.

Meanwhile, in the tertiary main body unit processing step S140, at least a part of the guide rail unit accommodation groove may be processed to have an uneven shape. Since at least a part of the guide rail unit accommodation groove is processed to have the uneven shape, the guide rail unit may be more securely press-fitted and bonded to the main body unit.

A press-fitting and bonding step S150 may be performed after the tertiary main body unit processing step S140. In the press-fitting and bonding step S150, the bonding layer is formed in the guide rail unit accommodation groove, and the guide rail unit is press-fitted and bonded. In this case, the guide rail unit may be stably press-fitted and bonded to the main body unit by the guide rail unit accommodation groove having the uneven shape formed in the tertiary main body unit processing step S140.

Meanwhile, the guide rail unit may have a length corresponding to a length of the main body unit. For example, when the length of the main body unit manufactured by extrusion is N×M (m), the guide rail unit press-fitted and bonded to the main body unit may also have the length of N×M (m). After the guide rail unit is press-fitted and bonded to the guide rail unit accommodation groove of the main body unit, the guide rail unit is left unattended for a predetermined time so that the state in which the guide rail unit is stably bonded to the main body unit is maintained.

Thereafter, a cutting step S160 may be performed. In the cutting step S160, the main body unit and the guide rail units, which are bonded and coupled to one another, may be cut together into a preset length. For example, in the cutting step S160, the main body unit and the guide rail unit may be cut together into a unit length of N (m). Therefore, the M main body units to which the guide rail units are press-fitted and bonded may be manufactured. The guide rail units are press-fitted and bonded to the single long main body unit, and then the single long main body unit is cut. Therefore, it is possible to reduce the process required to manufacture the linear robot according to the present disclosure and also shorten the manufacturing time, thereby improving productivity of the linear robot.

Thereafter, in an assembly step S170, the main body unit and the guide rail units, which are cut, may be assembled with the transfer block unit, the end block units, and the cover unit. In addition, the sensing module is assembled to the module coupling units provided on a part of the outer surface of the main body unit, such that the transfer block unit may accurately move from the first position to the second position (or vice versa).

The above description is simply given for illustratively describing the technical spirit of the present disclosure, and those skilled in the art to which the present disclosure pertains will appreciate that various changes and modifications are possible without departing from the essential characteristic of the present disclosure.

Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical spirit in the equivalent scope thereto should be construed as falling within the scope of the present disclosure.

What is claimed is:

1. A linear robot configured to transfer a transfer target object from a first position to a second position, the linear robot comprising:
    a main body unit comprising a main body base part seated on a ground surface, and main body sidewall parts protruding in an upward direction by a predetermined thickness from two opposite sides of the main body base part, the main body unit having an internal space defined by the main body base part and the main body sidewall parts;
    a transfer block unit partially accommodated in the internal space of the main body unit, configured to linearly move in one direction and an opposite direction, and having an upper portion on which the transfer target object is seated, the transfer block unit being configured to transfer the transfer target object from the first position to the second position;
    a pair of guide rail units disposed between the main body unit and the transfer block unit, coupled to the main body unit, and configured to guide the transfer block unit; and
    a pair of end block units configured to close two opposite ends of the main body unit and prevent the transfer block unit from separating in an axial direction of the main body unit,
    wherein the main body sidewall parts each have a guide rail unit accommodation groove recessed by a predetermined length in a direction perpendicular to the upward direction, and at least a part of a surface of the guide rail unit accommodation groove has an uneven machined surface,
    wherein at least one anodizing layer is formed on a surface of the main body excluding at least the guide rail unit accommodation groove,
    wherein the guide rail unit is coupled to the main body unit by means of a bonding layer formed between the guide rail unit and the guide rail unit accommodation groove,
    wherein the guide rail unit comprises guiding rail grooves configured to guide two opposite sides of the transfer block unit, a first end block unit of the pair of end block units, which is coupled to one end of the main body unit, comprises a pair of first guide rail groove accommodation units protruding toward the main body unit, and a second end block unit of the pair of end block units, which is coupled to the other end of the main body unit, comprises a pair of second guide rail groove accommodation units protruding toward the main body unit, and
    wherein an end part of the pair of guide rail units is disposed between the main body sidewall part and the first guide rail groove accommodation unit of the first end block unit, and the other end part of the pair of guide rail units is disposed between the main body sidewall part and the second guide rail groove accommodation unit of the second end block unit.

2. The linear robot of claim 1, wherein the guide rail unit accommodation groove comprises:
    a first accommodation groove surface;

a second accommodation groove surface formed to face the first accommodation groove surface and spaced apart from the first accommodation groove surface at a predetermined interval; and a third accommodation groove surface configured to connect the first accommodation groove surface and the second accommodation groove surface, and the third accommodation groove surface has the uneven surface.

3. The linear robot of claim 2, wherein the guide rail unit comprises:
  a first guide rail unit surface corresponding to the first accommodation groove surface of the guide rail unit accommodation groove;
  a second guide rail unit surface corresponding to the second accommodation groove surface of the guide rail unit accommodation groove; and
  a third guide rail unit surface corresponding to the third accommodation groove surface of the guide rail unit accommodation groove.

4. The linear robot of claim 1, wherein the main body unit and the guide rail unit are made of different materials, and rigidity of the guide rail unit is higher than rigidity of the main body unit.

5. The linear robot of claim 1, further comprising:
  a cover unit configured to cover upper sides of the pair of end block units and protect the internal space of the main body unit,
  wherein an upper side of at least a part of a transfer block unit main body of the transfer block unit, which moves in the internal space, is covered by the cover unit, and a pair of upper extension portions protruding in the upward direction by a predetermined thickness from two opposite sides of the transfer block unit main body is exposed to the outside.

6. The linear robot of claim 1, wherein the transfer block unit further comprises a transfer block endplate disposed on at least one end of a transfer block unit main body which is moved in the internal space of the main body unit, and the transfer block endplate selectively comes into contact with the end block unit.

7. The linear robot of claim 6, wherein the transfer block endplate comprises an oil-storing sealing unit impregnated with a lubricant in advance, and the lubricant, which is pressed and discharged from the oil-storing sealing unit as the transfer block unit moves, is applied onto at least a part of the transfer block unit.

8. The linear robot of claim 7, wherein the oil-storing sealing units comprise:

a first oil-storing sealing unit disposed at one side based on a hollow shaft of the transfer block endplate; and
a second oil-storing sealing unit disposed at the other side based on the hollow shaft of the transfer block endplate.

9. The linear robot of claim 1, further comprising:
  a sensing module coupled to a module coupling unit disposed on an outer surface of the main body sidewall part, the sensing module being configured to detect a position of the transfer block unit,
  wherein the sensing module comprises:
  a first position detection sensor configured to detect whether the transfer block unit is moved to the first position; and
  a second position detection sensor spaced apart by a predetermined distance from the first position detection sensor and configured to detect whether the transfer block unit is moved to the second position.

10. The linear robot of claim 1, wherein the main body unit and the pair of guide rail units are press-fitted and bonded and then cut into a preset length.

11. The linear robot of claim 1, wherein the uneven machined surface has a zigzag shape.

12. The linear robot of claim 1, wherein the uneven machined surface has a dotted shape.

13. A method of manufacturing the linear robot according to claim 1, the method comprising:
  an extrusion step of manufacturing the main body unit through an extrusion process, a primary main body unit processing step of processing the main body unit so that the main body unit comprises the main body base part and the main body sidewall parts, a secondary main body unit processing step of processing the main body unit to improve wear resistance and corrosion resistance, a tertiary main body unit processing step of processing the main body unit so that the main body unit comprises the guide rail unit accommodation groove for accommodating the guide rail unit and at least a part of the guide rail unit accommodation groove has an uneven shape, a press-fitting and bonding step of forming a bonding layer in the guide rail unit accommodation groove of the main body unit and press-fitting and bonding the guide rail unit, a cutting step of cutting the main body unit and the guide rail unit together into a preset length after press-fitting and bonding the main body unit and the guide rail unit, and an assembly step of assembling the main body unit and the guide rail unit, which are cut, with the transfer block unit and the end block unit.

\* \* \* \* \*